United States Patent [19]

Walker et al.

[11] Patent Number: 4,933,197

[45] Date of Patent: Jun. 12, 1990

[54] PROCESS TO MAKE JUICE PRODUCTS WITH IMPROVED FLAVOR

[75] Inventors: James B. Walker, Wilmington, Del.; Robert R. Ferguson, Lake Wales, Fla.

[73] Assignee: SeparaSystems LP, Santa Clara, Calif.

[21] Appl. No.: 362,546

[22] Filed: Jun. 7, 1989

[51] Int. Cl.$^5$ .................................................. A23L 2/02
[52] U.S. Cl. .................................. 426/330.5; 426/425; 426/599
[58] Field of Search ..................... 426/330.5, 599, 616, 426/15, 422, 425; 210/650, 652, 806, 641, 321.79, 651

[56] References Cited

U.S. PATENT DOCUMENTS

| | | | |
|---|---|---|---|
| 3,617,550 | 11/1971 | Elata | 210/655 |
| 4,083,779 | 4/1978 | Combe | 426/15 |
| 4,461,707 | 7/1984 | Thayer | 210/321.79 |
| 4,499,117 | 2/1985 | Bonneau | 426/15 |
| 4,643,902 | 2/1987 | Lawhon | 426/330.5 |
| 4,724,080 | 2/1988 | Dau | 210/651 |
| 4,775,477 | 10/1988 | Stahl | 210/641 |
| 4,781,837 | 11/1988 | Lefebore | 210/640 |
| 4,828,705 | 5/1989 | Thakore | 210/651 |

FOREIGN PATENT DOCUMENTS

| | | |
|---|---|---|
| 52-30574 | 10/1978 | Japan . |
| 53-115660 | 10/1978 | Japan . |
| 62-32866 | 2/1987 | Japan . |
| 1294332 | 8/1984 | U.S.S.R. . |

OTHER PUBLICATIONS

Micheals 1971 Membrane Ultrafiltration Chem Tech. January pp. 56–63.

*Primary Examiner*—Carolyn Paden

[57] ABSTRACT

A membrane process for producing a juice product with improved quality comprising feeding a single strength juice to a plurality of microfiltration/ultrafiltration stages wherein the first stage is a microfilter having a membrane pore size smaller than the spoilage microorganisms but substantially larger than the flavor and aroma molecules and wherein subsequent stages are ultrafilters having membranes of decreasing pore size.

7 Claims, 2 Drawing Sheets

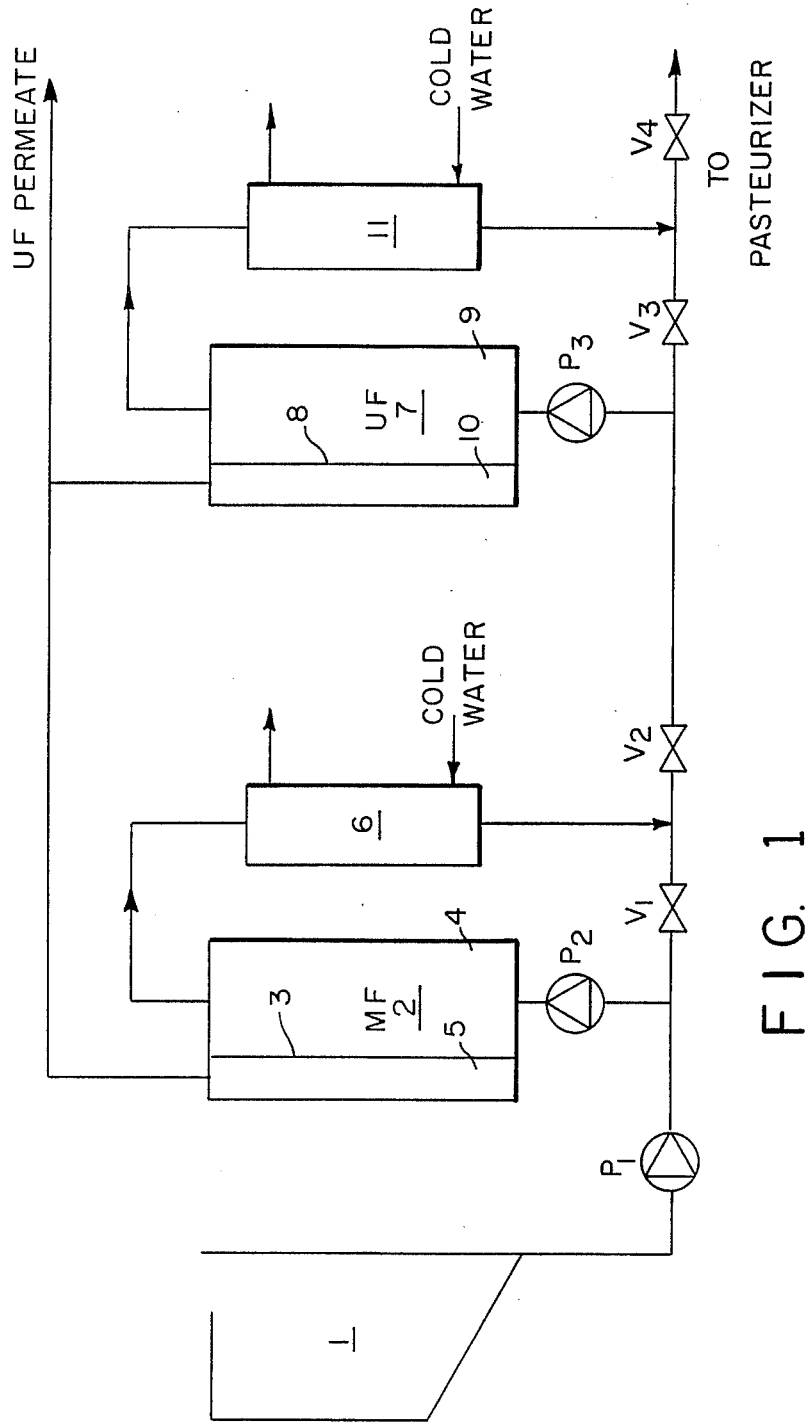
F I G. 1

PROCESS TO MAKE JUICE PRODUCTS WITH IMPROVED FLAVOR

FIELD OF INVENTION

This invention relates to an improved method for producing food juices that have superior flavor. Specifically, the method employs microfiltration and ultrafiltration membranes to separate a clarified serum from a bottom solids stream. Single strength juice is fed to a series of microfiltration/ultrafiltration (MF/UF) units equipped with membranes of decreasing pore size, the first in the series being a microfilter with a pore size substantially larger than the flavor and aroma molecules but small enough to retain essentially all spoilage microorganisms in the juice. The MF/UF permeate (also referred to herein as UF permeate) containing the flavor and aroma molecules, which may optionally be concentrated, may be recombined with the MF/UF retentate (also referred to herein as UF retentate) after the UF retentate is treated to inactivate the spoilage microorganisms.

BACKGROUND OF INVENTION

Juice directly from fresh fruits and vegetables is generally preferred by people, but is readily available only during growing seasons and in specific locations. Thus, juice from the fruits and vegetables must be shipped to other locations than where the fruit and vegetables are grown and the juice must be stored for later use during off-season.

To reduce shipping cost and to achieve longer storage, juices are concentrated and otherwise processed. Since consumers generally prefer the flavor, aroma, appearance and mouth feel of freshly squeezed juices, processors strive to retain such characteristics of freshly squeezed juice in the concentrate and ultimately in the reconstituted juice.

For example, orange juice is frequently concentrated to 60 to 65 weight percent sugar as sucrose (60° to 65° Brix) for shipping from large growing areas such as Brazil primarily to avoid the cost of shipping large quantities of water. Closer to the market, processors will dilute the concentrate to about 42° Brix, the concentration of frozen concentrate available in retail stores. During this processing step, essence and fresh juice are often added to enhance flavor and aroma that are lost when processing the fresh juice initially for shipping and storage.

The processes used to concentrate fruit and vegetable juices often involve steps which detract from the characteristics desired by consumers or have other drawbacks. Juices contain spoilage microorganisms that must be essentially destroyed to achieve adequate storage time (shelf life). These spoilage microorganisms are generally destroyed by pasteurization at temperatures of about 62° C. for 30 minutes or higher temperatures for shorter periods of time. Unfortunately, this process also volatilizes or destroys the aroma and flavor components that are of low molecular weight (30 to 155) and are easily affected at temperatures above 40° C.

Furthermore, fruits and vegetables contain enzymes which can cause off-aroma, off-flavor, loss of color and other undesirable characteristics. Pectinesterase, one undesirable enzyme for example, must be inactivated if one wants to keep the desirable characteristic body and cloud in juices such as orange and grapefruit juice. Temperatures often higher than those needed to pasteurize are needed to inactivate pectinesterase. Consequently, loss of flavor and aroma components is further compounded.

U.S. Pat. No. 4,643,902 (U.S. '902), which is incorporated herein by reference, teaches a process for avoiding many disadvantages of conventional juice processing. It uses ultrafiltration to preferentially pass a UF permeate containing flavor and aroma components while retaining spoilage microorganisms in a UF retentate. The UF retentate is then treated to inactivate, as by heating, a sufficient number of spoilage microorganisms to inhibit spoilage of the juice under storage conditions. The treated UF retentate is then recombined with the UF permeate that contains the flavor and aroma components to provide a food juice suitable for storage but having retained flavor and aroma components.

U.S. '902 avoids much of the volatilization of flavor and aroma components and subsequent need to recover some of the aqueous essence associated with conventional thermal evaporative concentration such as is done by thermally accelerated short time evaporation (TASTE) units for concentrating frozen orange juice. It avoids the entrainment of flavor and aroma components in ice crystals separated from the freeze concentrate during freeze concentration and the oxidative degradation associated with freeze concentration and sublimation concentration.

The process of U.S. '902 first separates pulp and other solids from the juice to a level sufficient for efficient ultrafiltration. It then employs an ultrafiltration stage to preferentially pass a UF permeate containing the lower molecular weight volatile flavor components of fruits and vegetables ranging in molecular weight from about 30 to 155 and other molecules such as sugar and amino acids while retaining larger molecules. The membranes are stated to be tighter than the bacteriological filters which have a pore size of less than 1 nanometer and, thus, retain spoilage compounds such as bacteria, yeasts, molds, fungi and the like as well as undesirable enzymes such as oxidase and pectinesterase, proteins, pectin, and oils.

The UF retentate is passed to an inactivation stage in which undesirable components are inactivated. U.S. '902 does not teach any critical limitations for this stage. It states that the methods employed can vary with spoilage microorganisms being inactivated or destroyed by heat, chemical treatment, desiccation, UV radiation, x-rays and the like. For foods, heating is the preferred method of inactivation.

The UF permeate is fed to a reverse osmosis (RO) unit to concentrate the flavor and aroma components as a RO retentate. The RO retentate, free of most of the spoilage microorganisms which remained in the UF retentate, can be recombined with the inactivated UF retentate to make a storage stable product, for example, a 50° Brix orange juice product capable of storage at about −4° C. for at least 12 months without spoiling.

Nevertheless, it has been found that flavor and aroma losses still occur and the final product quality is not so good as desired. This is now hypothesized as being due to two factors. It is felt that some flavor and aroma components are retained in the UF retentate even though the pore size (about 20,000 to 100,000 MWCO) theoretically should allow all such components (molecular weight of about 30 to 155) to pass through. Additionally, it is felt that the product is adversely affected if the processing time for the UF retentate is too long even if the process time is at low temperatures.

By using UF membranes sized to allow the flavor and aroma components to pass through as suggested in U.S. '902, a gel layer forms on the surface of the membrane reducing the effective pore size and resulting in retention of the smaller aroma and flavor components in the UF retentate. Also, the membranes tend to become plugged, particularly at high concentrations of soluble and insoluble components. As the membrane becomes plugged, the processing time for the UF retentate increases and product quality declines. By using a tighter UF membrane, plugging can be minimized but flavor and aroma components may be retained in the UF retentate instead of passing through into the UF permeate as desired.

Furthermore, some of the flavor and aroma components that are fed to the food juice RO concentrators taught in the art pass through into the RO permeate which is discarded.

The RO system of U.S. '902 has further limitations since final concentration depends on the operating pressure needed to overcome the osmotic pressure of the concentrated juice, the viscosity of the concentrate and fouling caused by pectin and other ingredients. Thus, a juice concentrate of about 25° to 30° Brix is typically produced. By employing membranes operable at higher pressures (1500 pounds per square inch gauge), a clarified orange juice, for example, can be concentrated to about 42° Brix.

U.S. Pat. No. 3,617,550 discloses a process for concentrating a feed solution by forcing it through a series of high rejection membranes, discarding or recycling the permeate and then further concentrating the retentate using a series of low rejection membranes where the osmotic pressure of the retentate exceeds the working pressure of the low rejection membranes. Preferably, the permeate from the low rejection membranes is recycled to the feed to the high rejection membranes. The process enables production of concentrates having osmotic pressures of several thousand pounds per square inch gauge (psig), which is above the working pressure of the reverse osmosis membranes taught. Orange juice concentrate, for example, with an osmotic pressure of three to four thousand psig would be about 60° to 65° Brix.

SUMMARY OF INVENTION

It has been discovered that improved product quality can be achieved by feeding a single strength juice to a plurality of microfiltration/ultrafiltration stages in series wherein a MF/UF retentate from any stage is fed to the subsequent stage and MF/UF permeates from all stages are combined. The first stage (microfilter) is equipped with a membrane having pore sizes that essentially retain all spoilage microorganisms in the UF retentate but wherein the pore size is substantially larger than the size of flavor and aroma molecules. The pore sizes are gradually decreased in each subsequent stage (ultrafilters).

The UF permeate may be fed to a reverse osmosis (RO) system for concentration of the aroma and flavor components as well as the sugar, amino acids and the like. The RO retentate may be recombined with the UF retentate after the UF retentate has been treated to inactivate spoilage microorganisms to make a final concentrated product.

The RO system preferably is as described in U.S. Pat. No. 3,617,550, U.S. Pat. No. 3,836,457 and most preferably in U.S. Ser. No. 362,719, to Walker filed on the same date herewith (AD-5779).

In the process of AD-5779, concentration of the aroma and flavor components as well as the sugar, amino acids and the like are substantially increased by feeding the UF permeate to a two-stage reverse osmosis (RO) system at elevated pressure, the first stage employing high rejection polyamide hollow-fiber membranes or membranes configured to operate under the elevated pressure and the second stage employing low rejection polyamide hollow-fiber membranes or membranes configured to operate under the elevated pressure.

The high rejection stage may be comprised of a series of RO units in which the RO retentate from the any RO unit feeds the subsequent RO unit with the RO retentate of the last unit in the series feeding the low rejection stage. The RO permeates from all units are combined for subsequent handling or disposal.

The low rejection stage may comprise a series of RO units wherein the membrane in each subsequent RO unit is more open and thus has a lower rejection than that in the preceding unit. The RO retentate from each unit is part of the feed to the subsequent RO unit and the RO permeate from each subsequent RO unit is fed to the preceding RO unit with the permeate from the first RO unit of the low rejection stage being recycled to the feed of the high rejection stage.

The RO retentate from the last in the series of low rejection RO units can be recombined with the UF retentate after the spoilage microorganisms in the UF retentate are inactivated to form a concentrated product. The resulting concentrate may be further concentrated if desired by feeding it to a series of low rejection RO units with increasingly open membranes, the RO retentate of one unit feeding the next and the RO permeate of each subsequent unit feeding the preceding unit with the RO permeate from the first in the series being returned as part of the feed to one of the initial low rejection units preferably with a feed concentration similar to the concentration in the RO permeate being recycled.

BRIEF DESCRIPTION OF DRAWINGS

FIG. 1 depicts a two-stage system of the present invention comprising a microfilter with a more open membrane followed by an ultrafilter with a tighter membrane, the retentate from the microfilter being the feed to the ultrafilter and the permeates being combined.

DETAILED DESCRIPTION OF INVENTION

Figure 2:
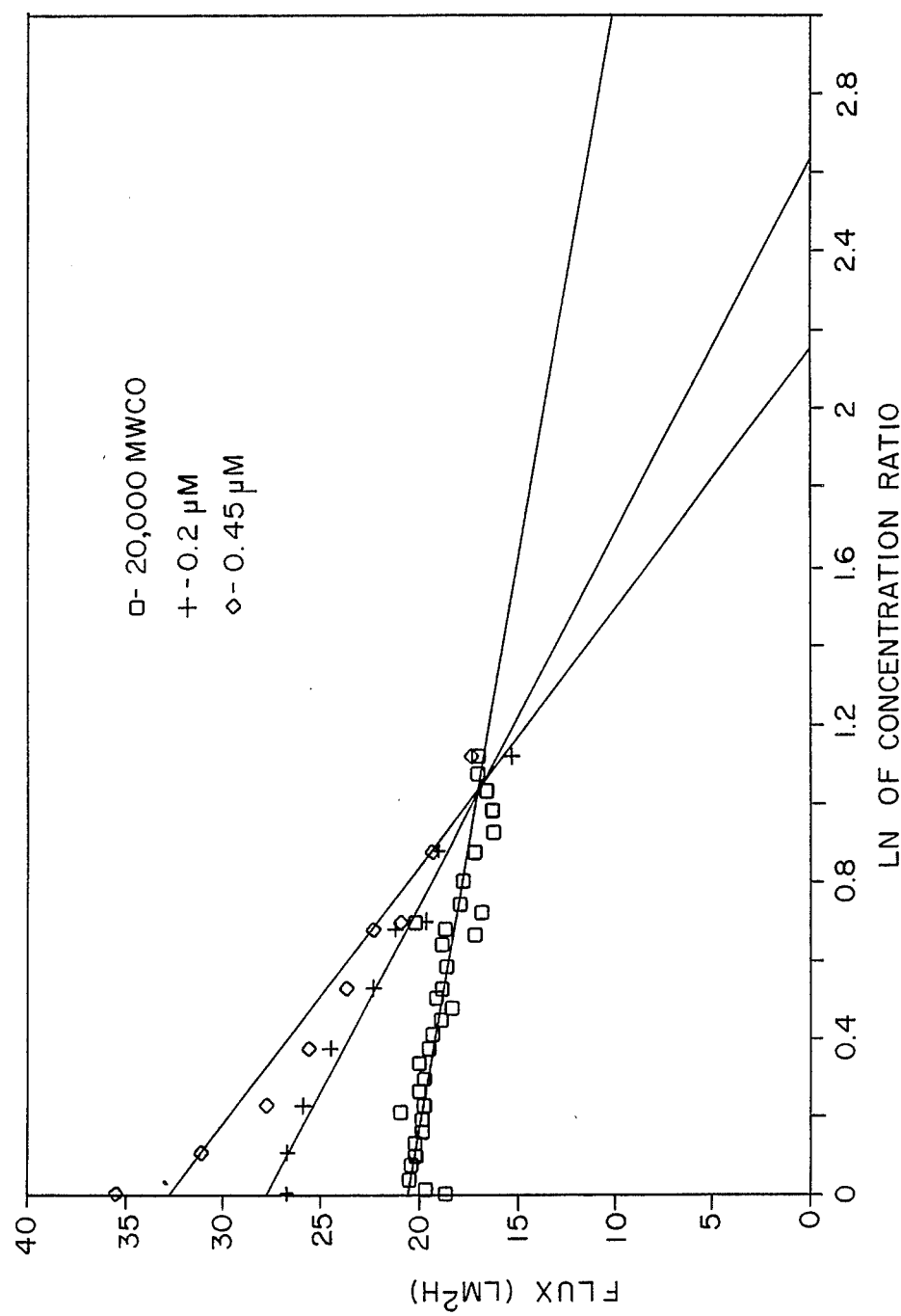
FIG. 2 is a plot of the permeate flux versus the natural logarithm of the ratio of the volume of initial system single strength feed to the total volume of retentate for membranes having different degrees of openness.

The process of this invention is broadly applicable to food juices including both fruit and vegetable juices, particularly citrus juices and more particularly orange and grapefruit juice. The process may be used to make storage stable concentrates with superior flavor, aroma and other desired characteristics from oranges, grapefruit, lemons, tangerines, tangelos, kumquats, applies, pears, peaches, apricots, pineapples, papaya, passion fruit, berries such as grapes, strawberries, raspberries, currants and blueberries, and vegetables such as tomatoes, celery, cabbage, onion, watercress, cucumber, carrot, parsley, beets, asparagus, potatoes, turnips, rutabagas and the like. It may be used to prepare flavor concentrates for use as food ingredients, for example, a cucumber concentrate to be used in a cucumber flavored dip.

Referring to FIG. 1, single strength juice (in the case of orange juice with a concentration of about 9° to 13° Brix) and a solids content at a level sufficient for efficient microfiltration and ultrafiltration is fed from feed tank 1 with feed pump $P_1$ to the feed of microfilter 2. The feed pump $P_1$ represents any known means used in ultrafiltration, particularly in food processing, for generating sufficient pressure, preferably 85 to 150 psig (587 to 1035 kPa) to cause a liquid stream to pass through porous membrane 3 positioned and supported so as to separate microfilter 2 into two volumes, a retentate side 4 and a permeate side 5.

Porous membrane 3 contains pores substantially larger than the low molecular weight aroma and flavor components, which are about 30 to 155 molecular weight, as well as other low molecular weight components such as sugar and amino acids but smaller than the larger molecular weight spoilage microorganisms (about 0.3 to 10 micrometers in size) such as bacteria, yeasts, mold, fungi and the like and other components such as enzymes, proteins, pectins and oils. Preferably the pore size is just small enough to prevent the larger undesirable molecules from passing through the membrane. Preferably, the pore size should be 0.1 to 0.2 micrometers.

Membranes for the microfiltration stage as well as for the ultrafiltration stage discussed below may be made of any material known in the art for use in microfiltration or ultrafiltration, as the case may be. For example, membranes may be polysulfones; polyolefins; fluoropolymers; or ceramic, stainless steel or carbon substrates with or without inorganic and/or polymeric coatings. They may be used alone or in combination with each other.

The liquid stream passing through the porous membrane 3, containing smaller molecule flavor and aroma juice components, is collected as a permeate and combined with downstream UF permeate streams for further processing as by reverse osmosis concentration not shown in the figure.

The portion of the feed stream that does not pass through the porous membrane, containing the larger spoilage components, is collected as a retentate and fed through optional heat exchanger 6 for cooling as needed to maintain the temperature of the permeate and retentate below about 15° C., preferably about 8° to 10° C. By positioning valves $V_1$ and $V_2$ and employing pump $P_2$ as needed to maintain an adequate pressure on the retentate side of the membrane 3, the retentate can be recirculated to microfilter 2 or fed to ultrafilter 7.

Ultrafilter 7 is operated in the same manner as microfilter 2, the primary difference being that the pore size of porous membrane 8 is smaller than the pore size of porous membrane 3. Preferably, the pore size of porous membrane 8 has a molecular weight cut-off (MWCO) of 20,000 to 200,000. The pressure is adjusted as necessary to cause a stream containing small molecules to pass through the membrane 8 into the permeate side 10 while retaining larger molecules on the retentate side 9. The permeate is combined with permeates from other MF/UF units for further processing if concentration is desired. The retentate is either recycled to ultrafilter 7 for temperature control or fed to a pasteurizer or other inactivation means to effectively inactivate spoilage microorganisms and other undesired components collected in the concentrated retentate.

Pasteurizers can be operated at about 62° C. for about 30 minutes or, preferably, at higher temperatures for shorter periods (85° C. for 15 to 20 seconds) to sufficiently inactivate the undesired microorganisms. The microorganisms will be sufficiently inactivated with about a 98% to 99% kill. Temperatures and time needed for a 100% kill, are more likely to abuse the product causing a "burned" flavor.

The permeate, preferably after concentration may be recombined with the inactivated retentate to make a storage stable product, that is for example, a 50° Brix product capable of storage at about −4° C. for at least 12 months without noticeable effect on juice quality, particularly upon reconstituting.

While FIG. 1 depicts a two unit system, there may be any number of additional MF units in parallel or series in the MF stage and UF units in parallel or series in the UF stage, the retentate from each each stage being fed to the subsequent and the permeate from each being combined. The number used is determined by the capacity of the system, capital cost and operating cost considerations.

Regardless of how many MF/UF units are used, the porosity of the membrane in each MF/UF unit should be such that permeate flow is maximized for the concentration of the retentate in that unit but such that the desired components pass into the permeate and the undesired components are retained in the retentate. At lower feed concentrations in the first stages of the system, more open membranes are used to maximize flux and passage of aroma and flavor components. At the higher concentrations that result as the retentate fed to the later stages becomes more concentrated, permeate flux will be maximized by having tighter membranes, that is, with smaller pore size.

EXAMPLES

EXAMPLE 1

The data in this example were generated using single strength California Valencia orange juice extracted in a FMC Low Oil Extractor and processed through a FMC Finisher with 0.020 inch openings in the screen. It had a sugar content of 10.8° Brix and an oil content of about 0.015% (v/v).

The single strength juice was fed to a De Danske Sukkerfabrikker (DDS) three section plate-and-frame module equipped with a total of 52 "UF 37" plates. Membranes having a 0.2 micrometer pore size and membranes having 100,000 MWCO and 20,000 MWCO were tested in the center section to determine flavor and aroma component passage.

The single strength orange juice feed was fed in parallel through the DDS section equipped with membranes of each of the pore sizes. Thus, each membrane was subjected to essentially the same feed pressure and temperature. The feed pressure to the DDS module was 84-88 psig (580-607 kPa), the retentate discharge pressure from the module was 35-38 psig (242-262 kPa) and the temperature was 10° C. The permeate pressure was about 0 psig (0 kPa) in each case.

Permeate samples were analyzed for flavor passage using a gas liquid chromatography (GLC) analysis as described by Braddock, et al. in "Quality of Freeze Concentrated Orange Juice", *Journal of Food Science* 52: 159 (1987). Results are as in Table I.

TABLE I

| Membrane Pore Size | Percentage Water-Soluble Flavors Passing | Percentage Oil-Soluble Flavors Passing |
|---|---|---|
| 0.2 uM | 100 | 11 |
| 100,000 MWCO | 40 | <1 |
| 20,000 MWCO | 30 | 1 |

EXAMPLE 2

This example shows the effect of pore size on permeate flow or flux. A starting volume of "Tropicana" single strength orange juice (not from concentrate) was fed to a DDS module equipped with 20,000 MWCO, 0.2 micrometer and 0.45 micrometer membranes. The retentate was recycled to the feed tank and the permeate from each membrane was collected separately. The feed to the DDS module was maintained at about 87 psig (600 kPa), the outlet (retentate) at about 29 psig (200 kPa) and the temperature at 16° C.

Periodically, the concentration ratio (ratio of starting volume in the system to volume remaining in the system at that time) was determined and the permeate flows were measured. The flow (liters per square meter per hour) for each pore size was then plotted versus the natural logarithm of the concentration ratio. FIG. 2 shows this data extrapolated to zero flux for membranes having different porosities. As can be seen, when using a 20,000 MWCO membrane, the flux, while decreasing some with increasing concentration ratio, remains relatively constant as compared to the 0.2 and 0.45 micrometer membranes. Higher flux can be achieved at low concentrations ratios (less than a volume concentration ratio of about 3 in this example) with the larger pore-size membranes, but flux is extrapolated to be about zero at about 13 to 14 for these membranes.

EXAMPLE 3

By combining the results of Examples 1 and 2, one can operate with a more open membrane in the first stage of a multi-stage system where the concentration ratio is low, resulting in most of the permeate flow and most of the passage of the low molecular weight flavor and aroma components into the permeate of that stage. In subsequent stages where the concentration ratio is higher due to removal of the permeate in earlier stages, flux rates are maximized by using tighter membranes. By maximizing the permeate flux, one can reduce the time that the retentate is in the system. This has a beneficial effect on the final product in those cases where the retentate after pasteurization is recombined with the permeate since those components of the juice that are still in the retentate and contribute to the quality of the final product are subjected to less abuse.

We claim:

1. A membrane process for preparing a storage stable clarified serum from food juice in a way that maximizes the passage of flavor and aroma components for a given serum flow and a given volume concentration of the bottom solids stream comprising the following steps:
    (a) providing from a juice-bearing fruit or vegetable a juice suitable for microfiltration and ultrafiltration;
    (b) permeating said juice first through a microfiltration stage which stage is equipped with a porous membrane having a pore size substantially larger than the size of desirable flavor and aroma components but smaller than undesirable microorganisms to form a permeate stream containing flavor and aroma components and a retentate stream containing undesirable microorganisms; and
    (c) feeding said retentate stream to an ultrafiltration stage which stage is equipped with a porous membrane having a smaller pore size than the microfilter in (b) above to separate a permeate and retentate stream; and
    (d) combining the permeate streams to produce the clarified serum product.

2. The process of claim 1 wherein the membrane in the microfilter of step (b) has a pore size of about 0.1 to 0.2 micrometers.

3. The process of claim 2 wherein the membrane in the ultrafilter of step (c) has a pore size of about 20,000 to 100,000 MWCO.

4. The process of claim 1 wherein the retentate from (c) is treated to inactivate a sufficient number of undesirable microorganisms to inhibit spoilage of juice under storage conditions and then combined with the permeate from (d).

5. The process of claim 1 further comprising concentrating the clarified serum of (d) containing the flavor and aroma components in a non-thermal concentration unit that does not volatilize or destroy the flavor and aroma components.

6. The process of claim 5 wherein the concentration unit is a reverse osmosis system.

7. The process of claim 5 wherein the retentate from (c) is treated to inactivate a sufficient number of undesirable microorganisms to inhibit spoilage of juice under storage conditions and then combined with the concentrated clarified serum.

* * * * *